Dec. 27, 1955 G. F. SCHERER 2,728,486
LUBRICATING APPARATUS
Filed Jan. 18, 1950
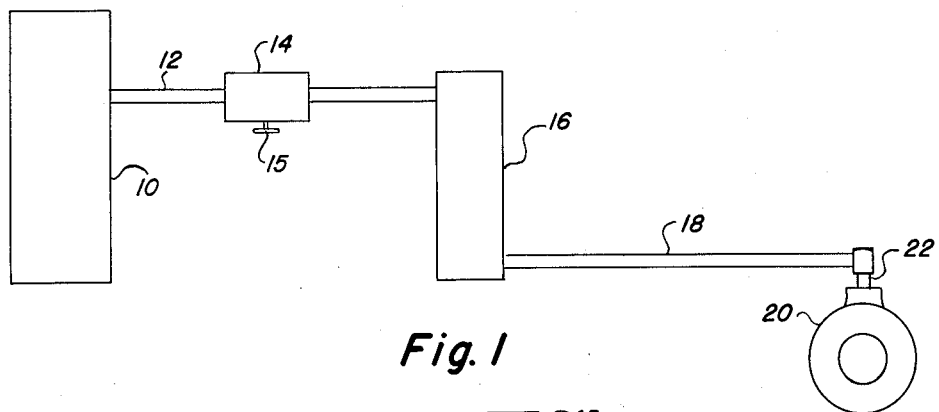
Fig. 1
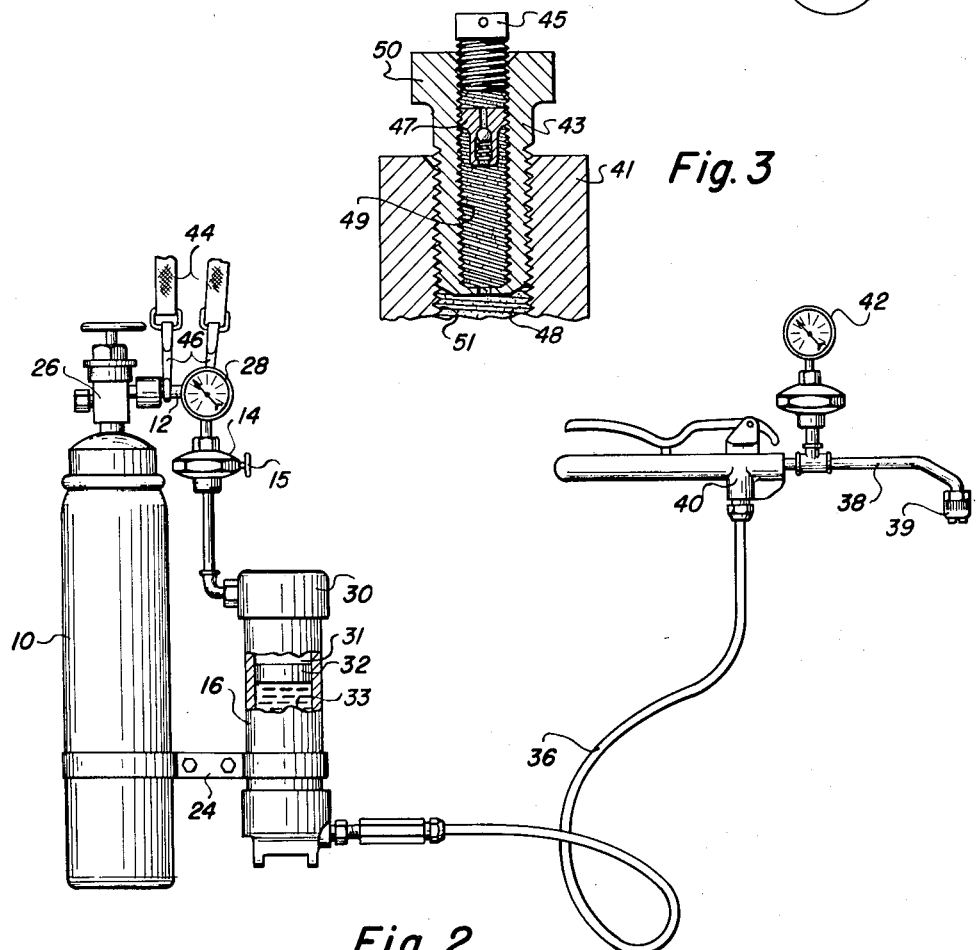
Fig. 3
Fig. 2
INVENTOR
George F. Scherer
By Strauch, Nolan & Diggins
Attorneys

United States Patent Office 2,728,486
Patented Dec. 27, 1955

2,728,486

LUBRICATING APPARATUS

George F. Scherer, Oakland, Calif., assignor to Rockwell Manufacturing Company, Pittsburgh, Pa., a corporation of Pennsylvania Application January 18, 1950, Serial No. 139,179

4 Claims. (Cl. 222—23)

This invention relates to lubricating apparatus and methods and has for its general object and purpose to provide a simple, inexpensive and easily portable arrangement for facilitating the application of lubricant under high pressure to lubricated valves.

In petroleum and other industries, transportation pipe lines are commonly equipped with large lubricated plug valves, each provided with a manually adjustable screw for feeding lubricant under pressure into internal distribution passages and for jacking the plug from its seat. Heretofore, a conventional grease gun has been used for replenishing the lubricant reservoir within the valve and even for applying plug jacking pressure. Such an operation is laborious and time consuming, about twenty five minutes or more of manual labor being commonly required to properly lubricate a large size valve.

Although workmen have been assigned schedules and instructions as to proper lubrication of these plug valves, the amount of labor involved results in a tendency to slight the task and often valves will be only partially lubricated or even remain unlubricated for long periods. I have provided a pressure lubrication device whereby a valve may be completely lubricated in a small fraction of the time required for conventional manual lubrication. With such a device a workman can readily maintain a service schedule and the small amount of labor involved insures that he is just as careful and complete in lubricating the last valve as the first.

In operation of large pipe lines, particularly, emergency conditions may appear where a valve must be filled with lubricant speedily to operate the valve as soon as possible. This is practically impossible with present day manual lubrication practice, and the invention supplies a long felt need for speedy lubrication and jacking of large valves.

My invention is also of great benefit in filling and obtaining and maintaining a desired compression pressure of a compressible and expansible lubricant mass, such as a plug valve plastic lubricant containing air or an inert gas dispersed in discrete bodies throughout the lubricant body.

It is, therefore, an important object of the present invention to provide novel lubricating apparatus for such valves, whereby time and manual effort required to supply lubricant within the valve and subject it to pressure are reduced to a minimum.

A further object of the invention is to provide a novel structure and method of lubrication wherein expansible lubricant may be introduced into the valve through a hollow lubricant screw, which latter may be tightened when plug jacking pressures are required.

A further object in one practical embodiment of the invention, is to provide a lubricant containing cylinder and a container of a suitable inert gas under pressure, with connecting means between them including a control valve and adjustable pressure regulator for admitting gas to one end of the lubricant containing cylinder at a desired pressure to expel lubricant from said cylinder through a flexible outlet line connected with the other end thereof, and a manually operable discharge nozzle at the free end of said line.

An additional object resides in the provision of means connecting the lubricant cylinder and gas container in a rigid assembly, together with means attached to said assembly to suspend the same from the person of the user for convenient transportation.

Another object is to provide a pressure gauge on a lubricant feed nozzle to measure the internal lubricant pressure of the valve.

With the above and other objects in view, the invention comprises the improved lubricating apparatus and the construction and relative arrangement of its several parts as will hereinafter be more fully described, illustrated in the accompanying drawings and subsequently incorporated in the sub-joined claims.

In the drawings wherein I have disclosed one simple and practical embodiment of the invention and in which similar reference characters designate corresponding parts throughout the several views:

Figure 1 is a diagrammatic view illustrating the operating principle of the present invention;

Figure 2 is a side elevation showing one practical embodiment of my novel portable lubricating apparatus; and Figure 3 is a fragmentary section illustrating the hollow lubricant screw arrangement of an embodiment of the invention.

Referring in further detail to the drawing and more particularly to Figure 1 thereof, 10 indicates a container of compressed gas, such as commercial nitrogen, having a pressure of approximately 2000 pounds per square inch. A rigid conduit 12 connects the pressure source container 10 through a suitable type of adjustable pressure regulator 14 with the upper end of a lubricant containing cylinder 16 to maintain a constant high fluid pressure in said cylinder. A manual adjustment knob 15 is provided for setting regulator 14 to maintain a desired constant pressure within the upper end of cylinder 16, and for practical lubrication service of large valves with expansible lubricant I employ a lubricant cylinder pressure of 1000 pounds per square inch.

To the lower end of cylinder 16, a flexible outlet line 18 is connected and provided at its free end with a suitable discharge nozzle which is adapted to be applied to a conventional valve fitting in the stem 22 of a conventional lubricated plug type valve 20. Lubricant may thus be rapidly supplied under the force of the constant gas pressure in the upper end of cylinder 16 through line 18 into the valve.

In Figure 2 a practical embodiment of the invention is illustrated, in which the gas container 10 and the lubricant cylinder 16 are connected in a rigid assembly by a metal strap 24 having end portions circumscribing the respective cylinders and welded or otherwise rigidly fixed thereto.

Conduit 12 is connected to the upper end of gas container 10 by a manually operable control valve 26. Between this valve and pressure regulator 14, a pressure gauge 28 is preferably connected in the conduit 12 to indicate the gas pressure in container 10. The other end of conduit 12 is coupled to the head 30 on the upper end of lubricant cylinder 16 to supply the desired pressure to chamber 31 above slidable piston 32.

Below piston 32, lubricant is provided in chamber 33 of cylinder 16. In the practical embodiment, line 18 comprises a flexible tube 36 of suitable length connected to lubricant chamber 33 in the lower end of cylinder 16 and equipped at its free end with a discharge nozzle 38 having an attachment fitting 39 and a manually operable valve 40. This nozzle, between the valve 40 and fitting 39 also carries a pressure gauge 42 for indicating the pressure of the lubricant within the valve. Fitting 39 is preferably of the type known as an Alemite connection with a suitable coacting fitting being provided on the valve.

The cylinders 10 and 16 are of comparatively small size and light weight and they may be conveniently suspended from the shoulder of the user by means of a flexible strap 44 having suitable hooks 46 at its ends for engagement with spaced parts of the conduit 12. The apparatus may thus be conveniently transported from place to place while the hands of the user remain free to operate the valves 26 and 40.

When nozzle 38 is applied to a suitable lubricant fitting on the valve, and nozzle valve 40 opened, the lubricant receiving passages within the valve will be very rapidly and completely filled with lubricant. The gas pressure within cylinder chamber 31 is maintained at approximately 1000 pounds per square inch by the action of regulator 14 for present day service conditions.

Figure 3 illustrates in large scale the stem 41 of a plug valve having a threaded bore 51 for receiving a lubricant screw 43. Screw 43 differs over the lubricant screws used in the usual plug valve in that it is hollow with a threaded bore 49.

A suitable lubricant inlet fitting 45, which is preferably of the Alemite type to couple with fitting 39 on the nozzle 38, is mounted in the upper end of bore 49 above the non-circular screw head 50. A suitable check valve assembly 47 is preferably mounted in bore 49 below fitting 45, although it may be omitted if fitting 45 is tight under the high pressures used in automatic lubrication.

Bore 51 contains a main reservoir space 48 that communicates with the usual valve passages. Otherwise the plug valve structure is preferably the same as that of Nordstrom 1,932,322 to which attention is directed for further detail.

This hollow lubricant screw arrangement is a preferable one where compressible plastic lubricant is employed in the valve. With fitting 39 coupled to fitting 45, the valve passages and reservoir 48 are speedily filled with the lubricant, which upon continuing application of pressure from cylinder 16 is compressed to a fraction of its original volume, sufficiently high pressure for compressing the lubricant without jacking the plug from its seat being applied controllably from cylinder 16. Now the valve is fully lubricated and will automatically lubricate itself when voids occur or the lubricant is otherwise depleted below the reservoir, as disclosed in my United States Letters Patent No. 2,658,713 issued November 10, 1953.

If, during valve operation, it is found necessary to jack the plug from its seat, a tool can be applied to screw head 50 to rotate the latter and increase the lubricant pressure within the valve until the plug leaves its seat, similarly to the manner in which the same is accomplished in a conventional valve.

Where expansible lubricant is employed, as the lubricant in the valve is compressed, its pressure is constantly indicated to the operator at gauge 42 even when valve 40 is closed. Hence during service the operator may check lubricant pressure like the service station operator checks tire pressure merely by attaching nozzle fitting 39 to the valve fitting and, if the pressure is low, opening valve 40 until it becomes adequate.

From the above description and the accompanying drawing, it will be seen that I have devised a novel lubricating apparatus which is particularly useful for servicing lubricated plug valves such as those commonly used on the oil transportation lines by the petroleum industry, whereby such valves may be rapidly supplied with lubricant and their desired predetermined pressure with a minimum of manual effort. As the several parts of the apparatus are of conventional form, the container of gas being available at any welding shop, the cost thereof will be relatively low and they may be expeditiously assembled and used by unskilled labor. If desired, instead of providing the suspension strap 44 the apparatus may be mounted upon a small wheeled truck.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A unitary valve lubricating apparatus for dispensing plastic lubricant of usual plug valve viscosity comprising in combination, a cylinder, a piston in said cylinder separating a lubricant chamber from a fluid pressure applying chamber, a container of high pressure gas secured to said cylinder, a conduit connecting said container with said pressure applying chamber and a gas pressure regulator in said conduit for maintaining a constant gas pressure in said fluid pressure applying chamber, a lubricant discharge tube connected to said lubricant chamber, a manually operable valved discharge nozzle on said tube, a terminal fitting on said nozzle for attachment to a cooperating fitting on the valve to be lubricated, and a gauge on said nozzle downstream of the valve of said nozzle for indicating the lubricant pressure within the valve being lubricated.

2. A unitary valve lubricating apparatus for dispensing plastic lubricant of usual plug valve viscosity comprising in combination, a cylinder containing a piston separating it into gas pressure applying chamber and a chamber for containing said plastic lubricant, a second cylinder containing high pressure gas, means rigidly connecting said cylinders in assembled relation, an outlet control valve at one end of the gas cylinder, a conduit connecting said valve with the adjacent end of the lubricant cylinder and leading into said gas pressure applying cylinder, a gas pressure gauge and a pressure regulator connected in said conduit, a lubricant discharge tube connected to the other end of said lubricant cylinder, a manually operable valved discharge nozzle on the free end, of said tube, a terminal fitting on said nozzle for attachment to a valve to be lubricated, and a gauge carried by said nozzle downstream of the valve in said nozzle for indicating lubricant pressure within the lubricated valve.

3. Portable valve lubricating apparatus comprising in combination, a container of compressed gas, a closed cylinder having a free piston disposed between a fluid pressure chamber and a lubricant chamber, a conduit between said container and said fluid pressure chamber, an adjustable pressure regulator in said conduit for maintaining a constant high pressure in said fluid pressure chamber, a flexible conduit connected to said lubricant chamber, a nozzle on the outer end of said flexible conduit having a manually operable valve, a value attachment fitting on the end of said nozzle and a pressure gauge between said valve and fitting for indicating the internal lubricant pressure of the valve being lubricated.

4. A portable unit apparatus for lubricating valves comprising, in combination, a container of compressed inert gas, a cylinder, a piston in said cylinder defining therein a lubricant chamber and a fluid pressure chamber, an outlet control valve at one end of said container, a rigid conduit connecting said valve with the fluid pressure chamber of said cylinder, a gas pressure gauge and an adjustable pressure regulator connected in said conduit, means rigidly connecting said cylinder and container in assembled relation, a flexible lubricant discharge tube connected to said lubricant chamber, a manually operable valved discharge nozzle on the free end of said tube, a terminal valve attachment fitting on said nozzle, and a gauge carried by said nozzle downstream of the valve in said nozzle for indicating lubricant pressure within the lubricated valves.

References Cited in the file of this patent

UNITED STATES PATENTS

| | | |
|---|---|---|
| 1,554,348 | Hawkins | Sept. 22, 1925 |
| 1,676,424 | Carr | July 10, 1928 |
| 1,764,968 | Mendenhall | June 17, 1930 |
| 1,783,689 | Angier | Dec. 2, 1930 |
| 2,058,748 | Wilkins | Oct. 27, 1936 |
| 2,062,031 | Lewis | Nov. 24, 1936 |
| 2,320,042 | McMahan | May 25, 1943 |
| 2,350,184 | Oys | May 30, 1944 |